(12) United States Patent
Murakami et al.

(10) Patent No.: US 10,908,367 B2
(45) Date of Patent: Feb. 2, 2021

(54) OPTICAL CONNECTOR CLEANING TOOL

(71) Applicant: NTT Advanced Technology Corporation, Kanagawa (JP)

(72) Inventors: Masayuki Murakami, Kanagawa (JP); Takenobu Hamano, Kanagawa (JP); Terumasa Kamouchi, Kanagawa (JP)

(73) Assignee: NTT ADVANCED TECHNOLOGY CORPORATION, Kanagawa (JP)

( * ) Notice: Subject to any disclaimer, the term of this patent is extended or adjusted under 35 U.S.C. 154(b) by 330 days.

(21) Appl. No.: 15/557,949

(22) PCT Filed: Feb. 8, 2016

(86) PCT No.: PCT/JP2016/053642
§ 371 (c)(1),
(2) Date: Sep. 13, 2017

(87) PCT Pub. No.: WO2016/147742
PCT Pub. Date: Sep. 22, 2016

(65) Prior Publication Data
US 2018/0067268 A1    Mar. 8, 2018

(30) Foreign Application Priority Data

Mar. 17, 2015 (JP) ................................. 2015-053110

(51) Int. Cl.
*G02B 6/38* (2006.01)
*B08B 1/00* (2006.01)

(52) U.S. Cl.
CPC ............ *G02B 6/3866* (2013.01); *B08B 1/008* (2013.01); *B08B 1/006* (2013.01); *G02B 6/3885* (2013.01)

(58) Field of Classification Search
CPC .... G02B 6/3866; G02B 6/3885; B08B 1/008; B08B 1/006
See application file for complete search history.

(56) References Cited

U.S. PATENT DOCUMENTS

| 8,402,587 B2 * | 3/2013 | Sugita | G02B 6/3866 |
| | | | 15/97.1 |
| 2003/0098045 A1 | 5/2003 | Loder et al. | |

(Continued)

FOREIGN PATENT DOCUMENTS

| CN | 1626285 A | 6/2005 |
| CN | 101120128 A | 2/2008 |

(Continued)

OTHER PUBLICATIONS

Office Action for Chinese Patent Application No. 201680016915.9, dated Mar. 4, 2019, 15 pages (8 pages of English Translation and 7 pages of Office Action).

(Continued)

*Primary Examiner* — Joseph J Hail
*Assistant Examiner* — J Stephen Taylor
(74) *Attorney, Agent, or Firm* — Womble Bond Dickinson (US) LLP (57) ABSTRACT

An optical connector cleaning tool includes a cleaning head that faces the lens (cleaning target portion) of an optical connector, and a cleaning cloth (3) that moves with respect to the cleaning head in a state in which the cleaning cloth is in contact with the lens. The cleaning cloth (3) is formed into a strip shape by a fabric (25) including a plurality of warps (28) in which a longitudinal direction thereof is a moving direction of the cleaning cloth moving with respect to the cleaning head. The warp (28) includes a first chemical fiber (31) and a second chemical fiber (32). One chemical fiber of the first chemical fiber (31) and the second chemical fiber (32) is in a stretched state, and the other chemical fiber is in a slack state. It is possible to provide an optical connector cleaning tool capable of cleaning a lens-type optical connector.

8 Claims, 12 Drawing Sheets

(56) References Cited

U.S. PATENT DOCUMENTS

| | | |
|---|---|---|
| 2005/0133062 A1 | 6/2005 | Kida |
| 2008/0209656 A1* | 9/2008 | Kida .................. B08B 1/00 15/210.1 |
| 2009/0007981 A1* | 1/2009 | Khokar ................ D02G 3/06 139/383 A |
| 2012/0093462 A1 | 4/2012 | Childers |
| 2016/0041345 A1 | 2/2016 | Kamouchi et al. |

FOREIGN PATENT DOCUMENTS

| | | | |
|---|---|---|---|
| CN | 105122108 A | | 12/2015 |
| CN | 107405651 A | | 11/2017 |
| EP | 1541249 A2 | | 6/2005 |
| JP | H05-245089 A | | 9/1993 |
| JP | H05245089 A | * | 9/1993 |
| JP | H11-009540 A | | 1/1999 |
| JP | 2005-173053 A | | 6/2005 |
| JP | 2008-302043 A | | 12/2008 |
| WO | 2003/047775 A2 | | 6/2003 |
| WO | WO 2014/141405 A1 | | 3/2013 |

OTHER PUBLICATIONS

International Search Report and Written Opinion for PCT Patent Application No. PCT/JP2016/053642, dated Apr. 26, 2016, 14 pages (7 pages of English Translation and 7 pages of Original Document).

International Preliminary Report on Patentability for PCT Patent Application No. PCT/JP2016/053642, dated Sep. 28, 2017, 12 pages (7 pages of English Translation and 5 pages of Original Document).

Office Action for Chinese Patent Application No. 201680016915.9, dated Mar. 23, 2020, 17 pages (10 pages of English Translation and 7 pages of Office Action).

Office Action for Chinese Patent Application No. 201680016915.9, dated Oct. 8, 2019, 17 pages (9 pages of English Translation and 8 pages of Office Action).

* cited by examiner

OPTICAL CONNECTOR CLEANING TOOL

TECHNICAL FIELD

The present invention relates to an optical connector cleaning tool that cleans a plurality of lens surfaces of an optical connector by a cleaning cloth.

BACKGROUND ART

In recent years, a ferrule with lenses for multiple channels has been developed and introduced (patent literature 1). The ferrule with lenses of this type is used for an optical port of a transmission apparatus or a plug of an optical cable that connects transmission apparatuses. The optical port is formed by a receptacle provided on a transmission apparatus, and is of a so-called female type. The plug is provided at the distal end of an optical cable, and is of a so-called male type. The mainstream of the ferrule with lenses has a plurality of plastic lenses that are integrally molded, and is stored in the above-described receptacle or plug. A plurality of lenses of an optical connector are provided while being arranged on the same plane, and are used in a cleaned state to suppress a loss as much as possible.

Cleaning of the optical connector can be done by an optical connector cleaning tool as described in, for example, patent literature 2. The cleaning tool disclosed in patent literature 2 has a structure in which a cleaning cloth contacts the cleaning target portion of an optical connector, and in this state, moves with respect to the cleaning target portion.

RELATED ART LITERATURE

Patent Literature

Patent Literature 1: US 20120093462
Patent Literature 2: WO 2014/141405

DISCLOSURE OF INVENTION

Problem to be Solved by the Invention

The conventional optical connector cleaning tool disclosed in patent literature 2 cannot properly clean the uneven lens portion of the ferrule with lenses. In addition, when the cleaning cloth of the cleaning tool is forcibly pressed against the lenses, the lenses made of a plastic are readily damaged.

The present invention has been made to solve the above-described problem, and has as its object to provide an optical connector cleaning tool capable of cleaning the cleaning target portion of a ferrule with lenses properly without any damage.

Means of Solution to the Problem

In order to achieve the above object, according to the present invention, there is provided an optical connector cleaning tool including a cleaning head that faces a cleaning target portion of an optical connector, and a cleaning cloth that moves with respect to the cleaning head in a state in which the cleaning cloth is in contact with the cleaning target portion, wherein the cleaning cloth is formed into a strip shape by a fabric including a plurality of warps in which a longitudinal direction thereof is a moving direction of the cleaning cloth moving with respect to the cleaning head, the warp includes a first chemical fiber and a second chemical fiber, and one chemical fiber of the first chemical fiber and the second chemical fiber is in a stretched state, and the other chemical fiber is in a slack state.

Effect of the Invention

In general, a tensile force acts on the cleaning cloth used to clean the optical connector because the cleaning cloth contacts the cleaning target portion of the optical connector while being wound up at the time of cleaning. If the cleaning cloth is made of one type of chemical fiber, the whole cleaning cloth stretches as the tensile force acts in the cleaning. The uneven lens-shaped cleaning target portion cannot properly be cleaned by the cleaning cloth in the stretched state.

In the cleaning cloth of the optical connector cleaning tool according to the present invention, the wind-up tensile force at the time of cleaning acts on the chemical fiber in a state in which the warps are stretched. For this reason, the chemical fiber in the stretched state resists the wind-up tensile force at the time of cleaning, and the chemical fiber in the slack state is not stretched by the wind-up tensile force. As a result, even if the cleaning target portion has an uneven lens shape, the chemical fiber in the slack state enters the valley portions of the unevenness, and the whole region of the cleaning target portion can properly be cleaned.

In addition, since the cleaning cloth has slack portions on the warps, the surface of the cleaning cloth softly swells. Hence, the cleaning cloth never damages the cleaning target portion.

Hence, even if the cleaning target portion includes a plurality of lenses of a ferrule with lenses, the optical connector cleaning tool can wipe and clean the whole region of the lenses by the cleaning cloth without damaging the lenses.

As the weft that forms the fabric in cooperation of the warps of the cleaning cloth, a weft formed by a fiber having a relatively small shrinkage factor can be used. When the weft of the fiber having the small shrinkage factor is used, the width of the cleaning cloth is stable. For this reason, even if the cleaning target portion includes a plurality of lenses arranged in the widthwise direction, the cleaning cloth can clean the lenses without extending off the lenses.

BEST MODE FOR CARRYING OUT THE INVENTION

An optical connector cleaning tool according to an embodiment of the present invention will now be described in detail with reference to FIGS. 1 to 19.

An optical connector cleaning tool 1 shown in FIG. 1 employs an arrangement in which a case 2 to be gripped by an operator (not shown) by a hand supports components to be described later. The optical connector cleaning tool 1 is different from the optical connector cleaning tool described in patent literature 2 previously proposed by the present applicant only in a cleaning cloth 3 (see FIG. 9), a pressing member 16 (see FIG. 9), and a cap 8 (see FIG. 1) to be described later, and the rest of the arrangement is the same. Hence, concerning a cleaning head 4 (see FIG. 3), a driving mechanism 5, and the like of the optical connector cleaning tool 1, only the outline of arrangements will be described.

The case 2 of the optical connector cleaning tool 1 includes a grip portion 6 to be gripped by the operator, and a nose portion 7 projecting from the grip portion 6. A description will be made below by defining the direction in which the nose portion 7 projects from the grip portion 6 as frontward or front side, and the opposite direction as rearward or rear side.

Figure 1:
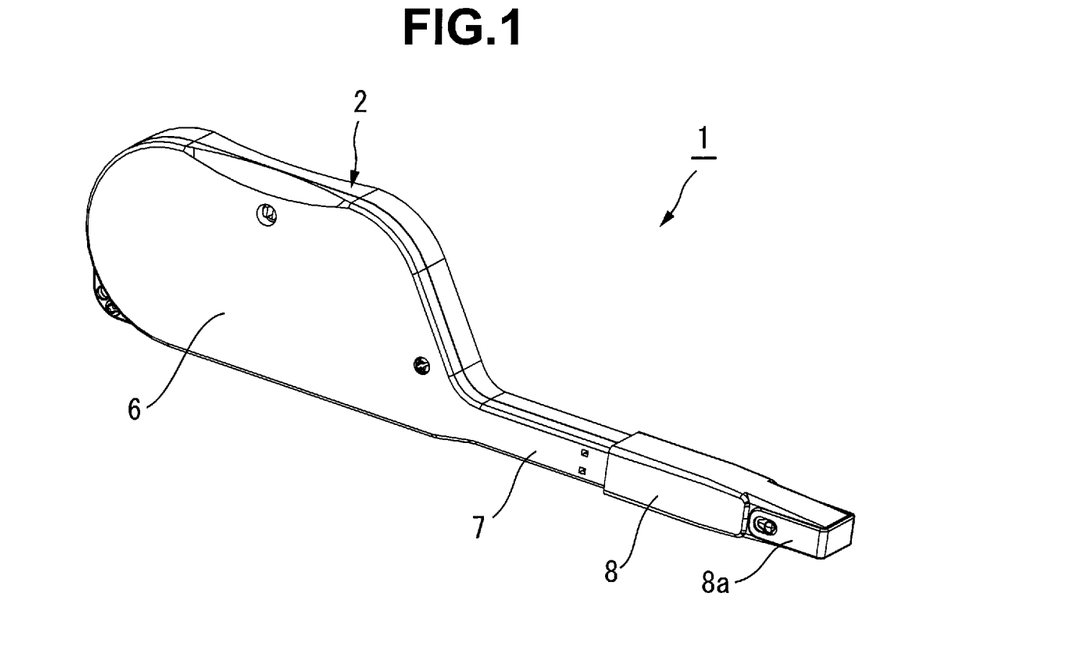
FIG. 1 is a perspective view showing a state in which the cap of an optical connector cleaning tool according to the present invention is attached.

The cap 8 is attached to the nose portion 7 of the case 2 shown in FIG. 1. The cap 8 is used to connect an optical plug 9 (see FIG. 5A) to be described later. The cap 8 is formed into a rectangular tubular shape and detachably attached to the nose portion 7, as will be described later in detail. A cover 8a that opens/closes an opening portion is pivotally provided at the front end of the cap 8.

Figure 2:
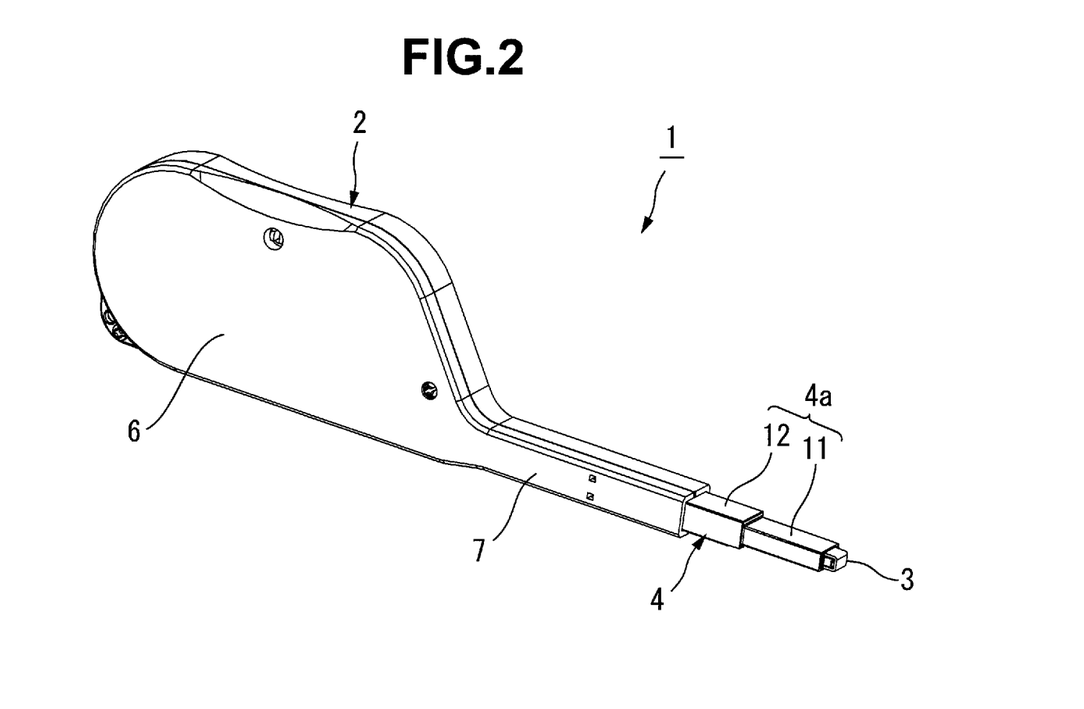
FIG. 2 is a perspective view showing a state in which the cap of the optical connector cleaning tool is detached.

In a state in which the cap 8 is detached from the nose portion 7, the front portion of the cleaning head 4 is exposed, as shown in FIG. 2.

Figure 3:
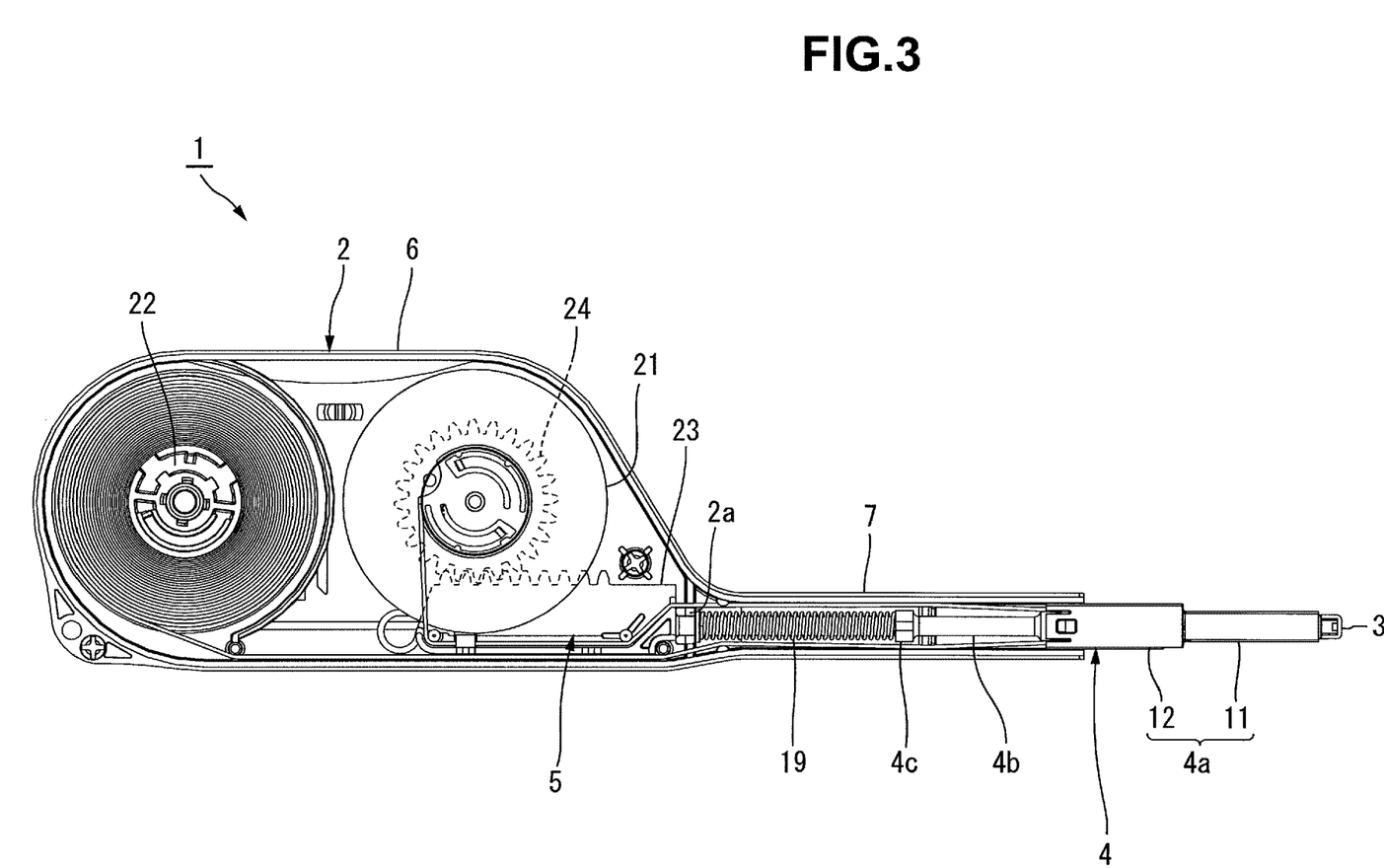
FIG. 3 is a side view showing the arrangement in a case.

The cleaning head 4 is formed by two functional units to be described later. As shown in FIG. 3, the cleaning head 4 is inserted into the whole area in the nose portion 7 and supported by the nose portion 7 to be movable in the front-and-rear direction. The two functional units are a cleaning unit 4a projecting from the nose portion 7, and a connecting portion 4b that connects the cleaning unit 4a to the driving mechanism 5 to be described later.

The cleaning unit 4a of the cleaning head 4 is formed by a first rectangular tube 11 that forms the front end, and a second rectangular tube 12 provided on the rear side of the first rectangular tube 11. The second rectangular tube 12 is formed into such a shape that has an opening portion wider and higher than the first rectangular tube 11.

As shown in FIGS. 4A to 4C and 5A to 5E, a receptacle 13 for an optical port (not shown) or the optical plug 9 for an optical cable is connected to the first rectangular tube 11.

Figure 6:
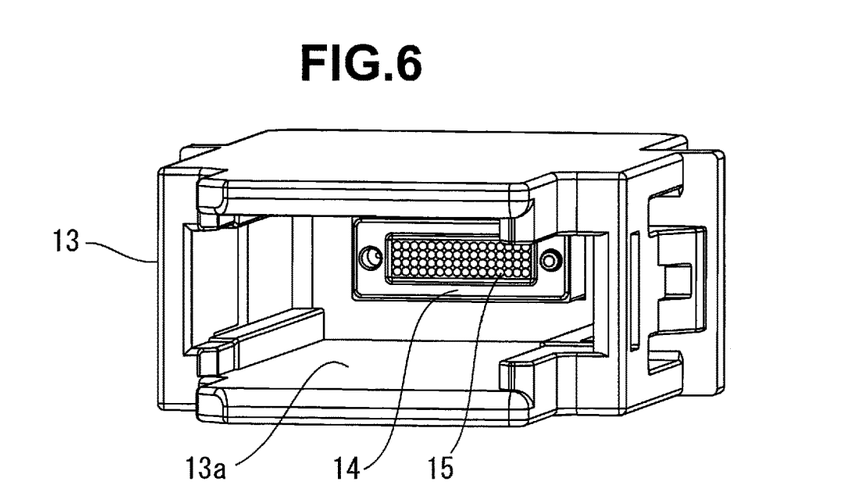
FIG. 6 is a perspective view showing the receptacle and the ferrule with lenses.

As shown in FIG. 6, the receptacle 13 has a recessed portion 13a. The recessed portion 13a is formed into a shape in which the optical plug 9 can be fitted. The first rectangular tube 11 (see FIGS. 4A to 4C) of the cleaning head 4 is formed into a shape that is fitted in the recessed portion 13a. The aspect ratio of the opening portion of the first rectangular tube 11 is not 1:1. For this reason, the first rectangular tube 11 is not fitted in the recessed portion 13a in a wrong orientation.

A ferrule 14 with lenses (to be described later) that forms "an optical connector" in the present invention is provided on the bottom of the recessed portion 13a.

Figure 7:
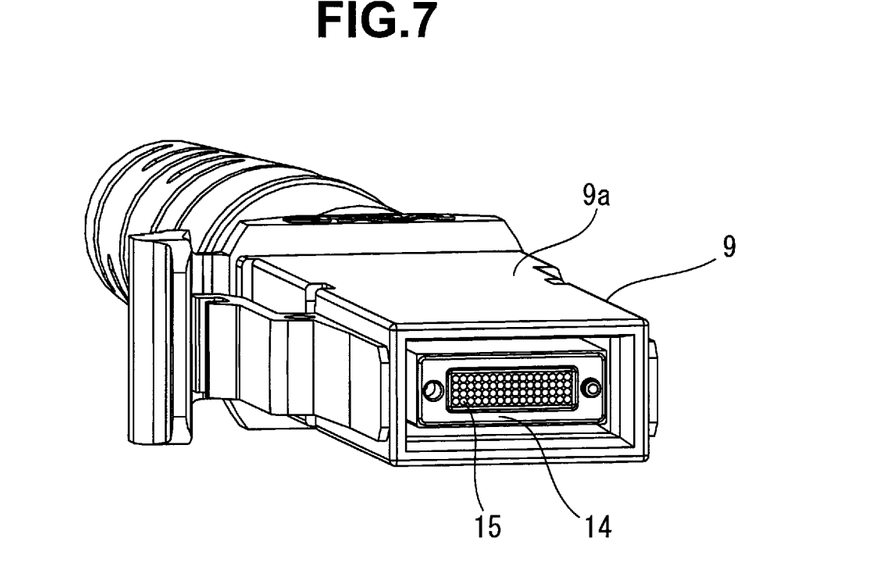
FIG. 7 is a perspective view showing the optical plug and the ferrule with lenses.

As shown in FIG. 7, the optical plug 9 includes a connecting portion 9a having a rectangular tubular shape. The front end of the cap 8 is formed into a shape in which the connecting portion 9a is fitted. The ferrule 14 with lenses is provided in the connecting portion 9a.

Figure 8:
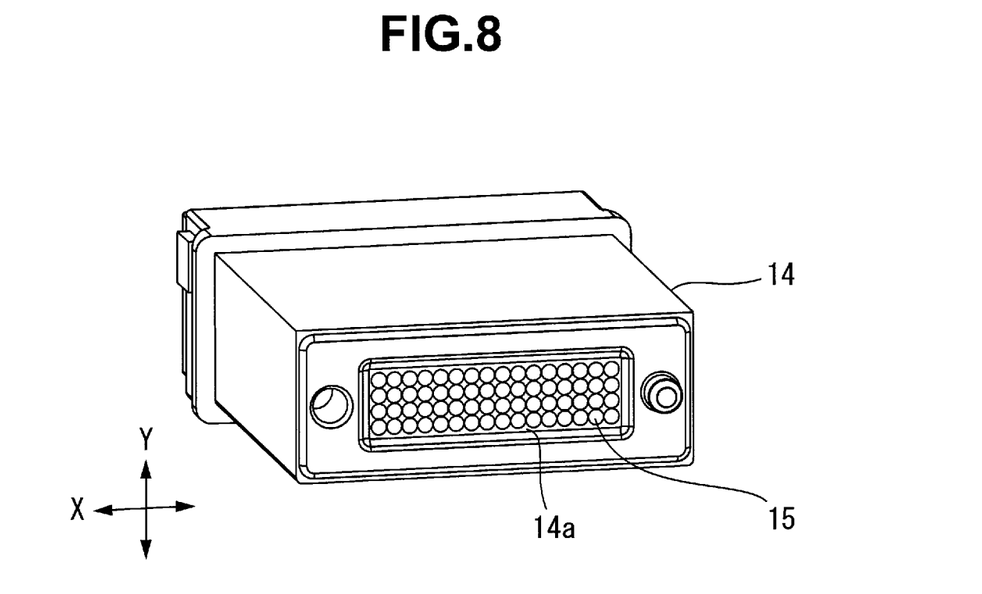
FIG. 8 is a perspective view of the ferrule with lenses.

As shown in FIG. 8, the ferrule 14 with lenses includes a number of lenses 15. The lenses 15 are provided at one end of the ferrule 14 with lenses in a state in which the lenses project from the bottom of a concave portion 14a formed at the one end. The lenses 15 are so-called convex lenses, and are arranged at a predetermined interval in the vertical and horizontal directions that are orthogonal to each other when viewed from the connecting direction. In FIG. 8, the vertical direction in which the lenses 15 are arranged is defined as a Y direction indicated by an arrow, and the horizontal direction is defined as an X direction indicated by an arrow. In this embodiment, the lenses 15 correspond to "a cleaning target portion of an optical connector" in the present invention.

Figure 9:
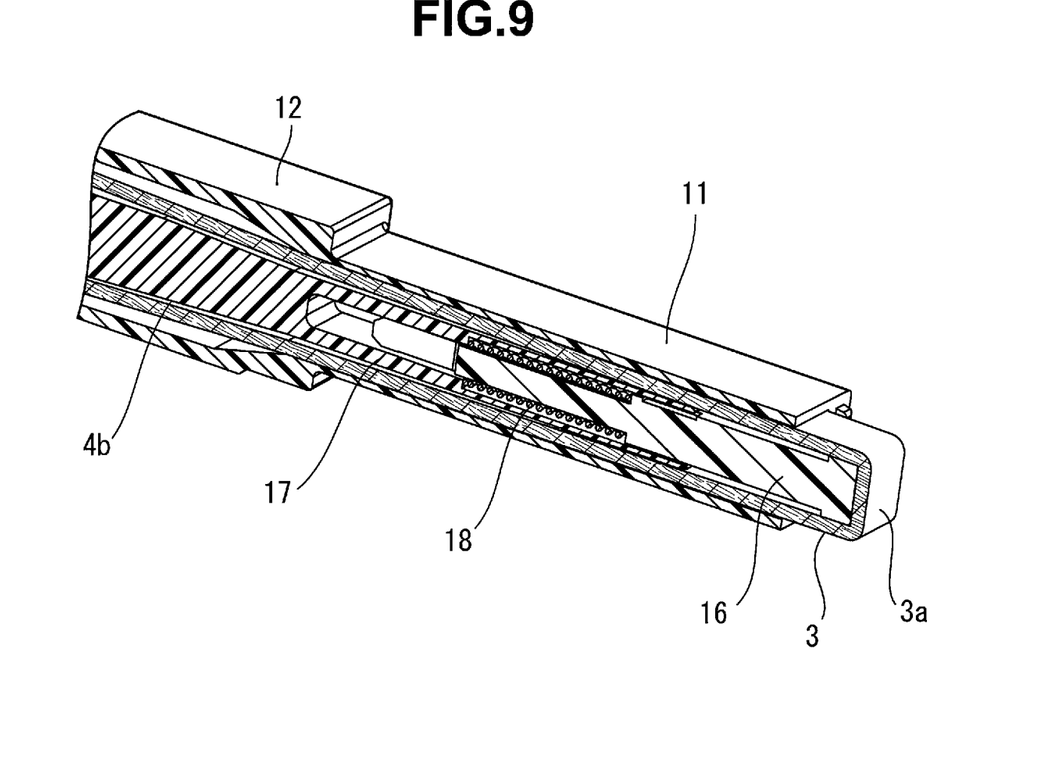
FIG. 9 is a sectional view of the distal end of the cleaning head.
Figure 10:
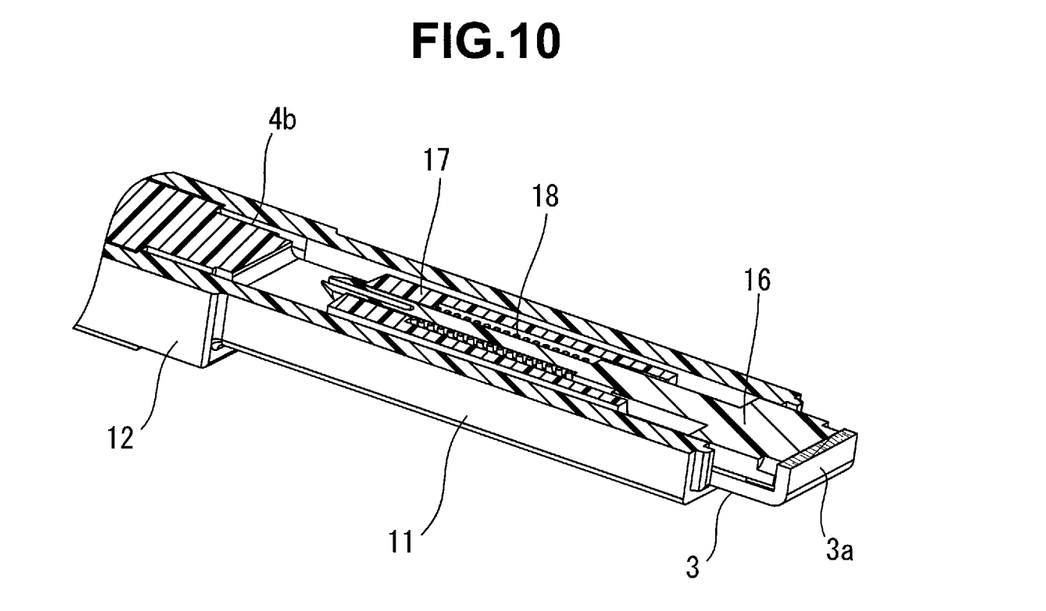
FIG. 10 is a sectional view of the distal end of the cleaning head.

As shown in FIGS. 9 and 10, part of the strip-shaped cleaning cloth 3 (to be described later) and the pressing member 16 that presses the cleaning cloth 3 to the front side are stored in the first rectangular tube 11 and the second rectangular tube 12. The cleaning cloth 3 is stored in a state in which the cleaning cloth 3 sandwiches the pressing member 16 and extends in the front-and-rear direction along the first rectangular tube 11 and the second rectangular tube 12. The cleaning cloth 3 is folded back along the front end of the pressing member 16. A front end 3a of the cleaning cloth 3 along the front end of the pressing member 16 cleans the lenses 15. The pressing member 16 is made of a plastic and supported by a front end member 17 of the connecting portion 4b to be movable in the front-and-rear direction only by a predetermined distance. In addition, the pressing member 16 is biased frontward by the spring force of a first compression coil spring 18. For this reason, when the lenses 15 are pressed against the front end 3a of the cleaning cloth 3, the pressing member 16 and the cleaning cloth 3 retreat against the spring force of the first compression coil spring 18, and the cleaning cloth 3 is pressed against the lenses 15 by the spring force of the first compression coil spring 18.

As shown in FIG. 3, the connecting portion 4b of the cleaning head 4 is formed into a shape extending in the front-and-rear direction in the nose portion 7, and is biased frontward by a second compression coil spring 19. The connecting portion 4b is inserted into the central portion of the second compression coil spring 19, and in this state, the second compression coil spring 19 is compressed and inserted between a pressure receiving piece 4c provided at the intermediate portion of the connecting portion 4b and a pressure receiving piece 2a of the case 2. For this reason, the cleaning head 4 can move rearward with respect to the case 2 against the spring force of the second compression coil spring 19.

The cleaning cloth 3 is passed between the connecting portion 4b and the nose portion 7 of the case 2.

The distal end side of the cleaning cloth 3 is wound around a wind-up reel 21 provided in the grip portion 6 of the case 2. The rear end side of the cleaning cloth 3 is wound around a supply reel 22 provided in the grip portion 6. The wind-up reel 21 and the supply reel 22 are rotatably supported by the case 2.

The wind-up reel 21 is driven by the driving mechanism 5 to be described later, and thus rotates clockwise in FIG. 3 and winds up the cleaning cloth 3. When wound up by the wind-up reel 21, the cleaning cloth 3 is pulled and drawn from the supply reel 22. The cleaning cloth 3 moves from the supply reel 22 through the grip portion 6 and the nose portion 7 of the case 2, the first rectangular tube 11, and the second rectangular tube 12. At this time, if the ferrule 14 with lenses is pressed against the cleaning head 4, the cleaning cloth 3 moves with respect to the lenses 15 and the cleaning head 4 in a state in which the cleaning cloth 3 is contact with the lenses 15.

The driving mechanism 5 includes a rack 23 connected to the connecting portion 4b of the cleaning head 4, and a gear 24 provided in the wind-up reel 21 in a state in which the gear 24 meshes with the rack 23. For this reason, when the cleaning head 4 retreats with respect to the case 2 against the spring force of the second compression coil spring 19 (moves to the opposite side of the ferrule 14 with lenses), the rack 23 rotates the gear 24 and the wind-up reel 21 clockwise in FIG. 3, and the cleaning cloth 3 is wound up by the wind-up reel 21. That is, the driving mechanism 5 performs driving so as to pull the cleaning cloth 3 and draws it from the supply reel 22 such that the cleaning cloth 3 moves with respect to the cleaning head 4. Hence, the longitudinal direction of the cleaning cloth 3 is inevitably a direction that continues long, that is, a direction in which warps (first thread materials 28 to be described later) shown in FIG. 12 extend.

Figure 11:
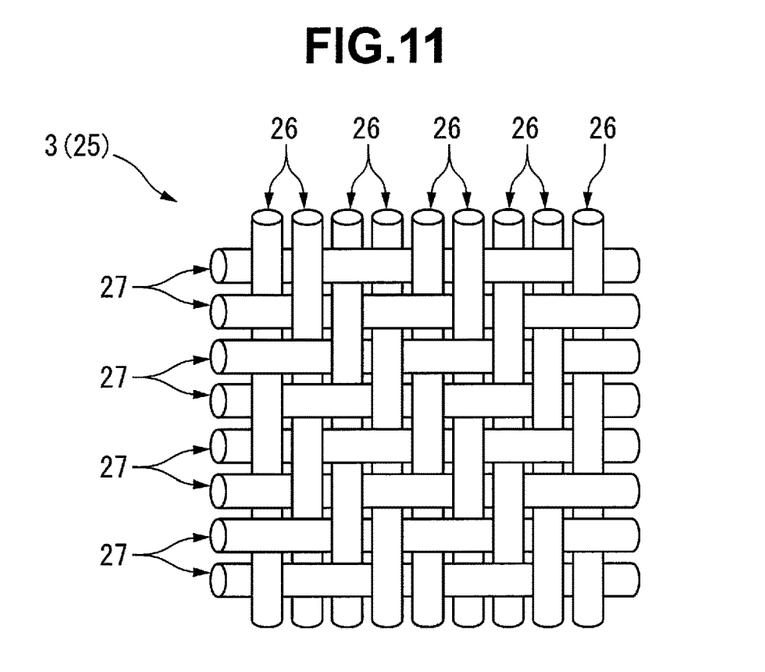
FIG. 11 is a schematic view showing the structure of a fabric serving as a cleaning cloth.

As shown in FIG. 11, the cleaning cloth 3 is formed into a strip shape by a fabric 25. The fabric 25 according to this embodiment is a twill. The fabric 25 is formed by a number of warps 26 whose longitudinal direction is the moving direction of the cleaning cloth 3 moving with respect to the cleaning head 4, and a weft 27 interwoven with the warps 26. The twill is woven with a large float, and the cross points between the warps 26 and the weft 27 are arranged at a predetermined interval. The twill can form a soft and thick fabric next to a satin weave.

Figure 12:
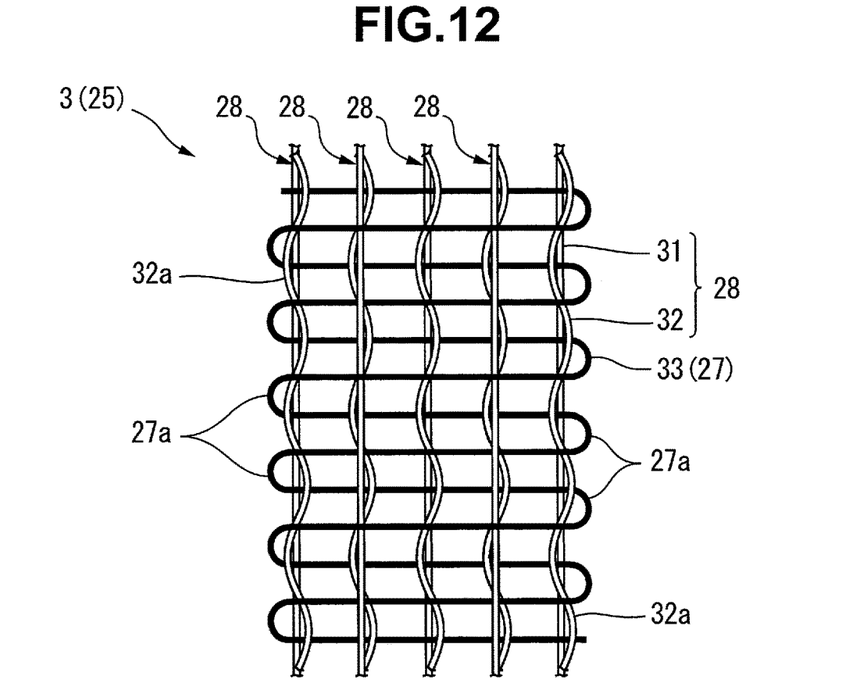
FIG. 12 is a schematic view showing the arrangement of warps and a weft.

One warp 26 of the fabric 25 is formed by bundling a predetermined number of first thread materials 28 shown in FIG. 12. The first thread material 28 shown in FIG. 12 is formed by a first chemical fiber 31 and a second chemical fiber 32, which extend in the longitudinal direction of the cleaning cloth 3. The first chemical fiber 31 and the second chemical fiber 32 have different shapes, as shown in FIG. 12. The first chemical fiber 31 is in a stretched state and extends straight. On the other hand, the second chemical fiber 32 is in a slack state and meanders along the first chemical fiber 31.

The first chemical fiber 31 and the second chemical fiber 32 which have the above-described shapes can be implemented by, for example, a chemical treatment using a drug solution. To implement the above-described shapes by the chemical treatment, the first chemical fiber 31 and the second chemical fiber 32 are considered to be made using materials whose shrinkage factors when dipped in the drug solution are different. That is, the first chemical fiber 31 is made using a material having a relatively large shrinkage factor, and the second chemical fiber 32 is made using a material having a relatively small shrinkage factor.

For example, the first chemical fiber 31 is made of nylon, and the second chemical fiber 32 is made of PET (polyethylene terephthalate) whose shrinkage factor is smaller than the nylon. The first and second chemical fibers are dipped in a drug solution that shrinks nylon. The drug solution used in this embodiment has a shrinkage factor of about 20% for nylon. The shrinkage factor of the first chemical fiber 31 dipped in the drug solution by the chemical treatment is larger than the shrinkage factor of the second chemical fiber 32 dipped in the drug solution. That is, of the first chemical fiber 31 and the second chemical fiber 32, the first chemical fiber 31 whose shrinkage factor by the chemical treatment is larger stretches, and the second chemical fiber 32 slackens. Hence, the shapes shown in FIG. 12 are obtained. In this embodiment, the first chemical fiber 31 corresponds to "one chemical fiber having a large shrinkage factor" in the present invention. The first thread material 28 according to this embodiment is formed by the first chemical fibers 31 in a volume ratio of 60% and the second chemical fibers 32 in a volume ratio of 40%.

Figure 13:
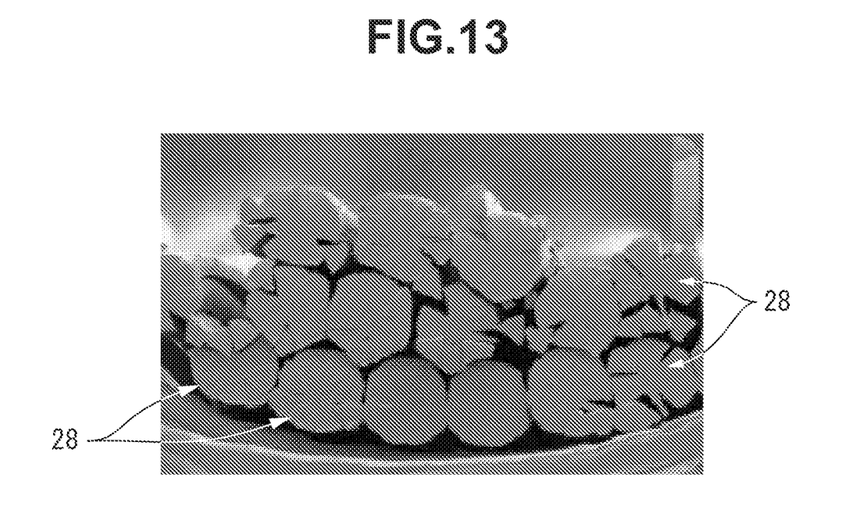
FIG. 13 is a micrograph showing the sectional shape of first thread materials before a chemical treatment.
Figure 14:
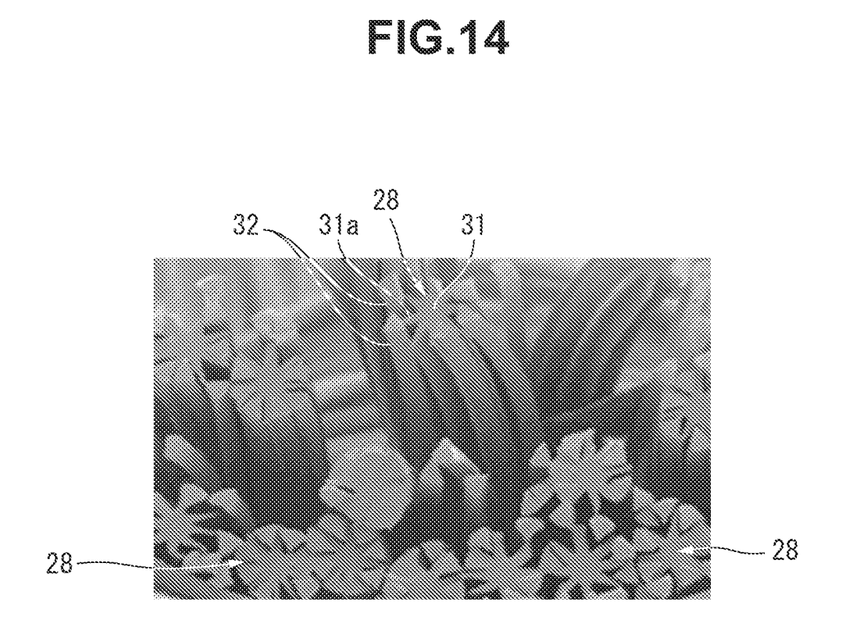
FIG. 14 is a micrograph showing the sectional shape of the first thread materials after the chemical treatment.

As the first thread material 28 to which the chemical treatment is applied, for example, a material formed as shown in FIGS. 13 and 14 can be used. FIG. 13 is a micrograph of the first thread materials 28 before the chemical treatment. FIG. 14 is a micrograph of the first thread materials 28 after the chemical treatment. As is apparent from FIGS. 13 and 14, the first chemical fibers 31 and the second chemical fibers 32 are spread out by the chemical treatment, and the first chemical fibers 31 shrink largely relative to the second chemical fibers.

The first thread material 28 shown in FIGS. 13 and 14 is formed using the first chemical fiber 31 as the core. The first chemical fiber 31 includes a plurality of plate-shaped pieces 31a that radially extend in the sectional shape. The plate-shaped pieces 31a are connected to each other at the center of the radiating shape. The second chemical fibers 32 each having a triangular sectional shape are arranged between the plurality of plate-shaped pieces 31a. That is, the second chemical fibers 32 are arranged to surround the first chemical fiber 31.

The weft 27 of the fabric 25 includes a second thread material 33 (see FIG. 12) made of a chemical fiber that shrinks less than the first chemical fiber 31 (one chemical fiber having a large shrinkage factor) when dipped in the above-described drug solution, and is formed by bundling a plurality of second thread materials 33. As shown in FIG. 12, the weft 27 is folded back at the two ends of the cleaning cloth 3 in the widthwise direction. That is, at the two ends of the cleaning cloth 3 in the widthwise direction, the warps 26 are gripped by folded portions 27a of the weft 27. The chemical fiber of the second thread material 33 according to this embodiment is made of PET.

When the fabric 25 formed by interweaving the weft 27 with the plurality of warps 26 is dipped in the above-described drug solution, a number of first thread materials 28 of each warp 26 obtain a shape different from the initial shape. That is, when the first chemical fiber 31 having a large shrinkage factor shrinks by the chemical treatment, the second chemical fiber 32 slackens. At this time, the shrinkage factor of the weft 27 is smaller than the shrinkage factor of the first chemical fiber 31.

Of the plurality of second chemical fibers 32 surrounding the first chemical fiber 31, the slack of the second chemical fibers 32 in contact with the weft 27 (second thread material 33) is regulated by the weft 27. For this reason, slack portions 32a are formed at portions where the slack is not regulated by the weft 27 in the longitudinal direction of the second chemical fiber 32. That is, the slack portions 32a project from the first thread material 28.

Figure 15:
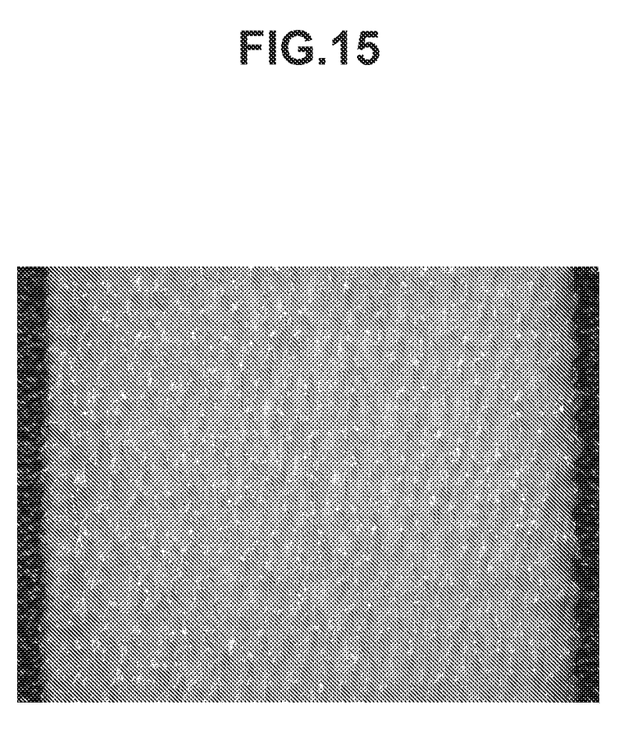
FIG. 15 is a micrograph showing the surface shape of the cleaning cloth.

When the slack portions 32a are formed in this way, a number of uneven portions are formed on the surface of the cleaning cloth 3, as shown in FIGS. 14 and 15, and the cleaning cloth 3 softly swells.

A procedure of cleaning the ferrule 14 with lenses in the receptacle 13 or the ferrule 14 with lenses in the optical plug 9 using the thus configured optical connector cleaning tool 1 will be described next.

Figure 4A:
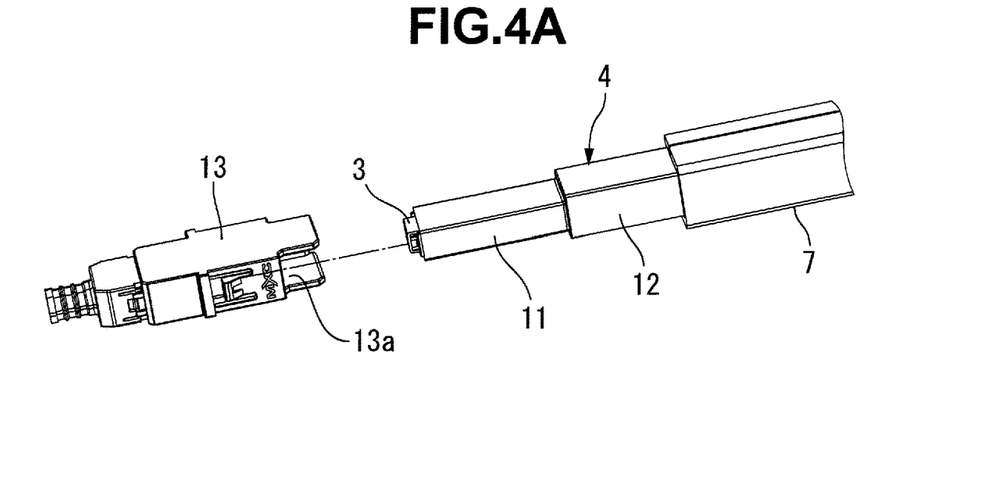
FIG. 4A is a perspective view showing a state in which a receptacle faces a cleaning head so as to explain a procedure of cleaning a ferrule with lenses in the receptacle.
Figure 4B:
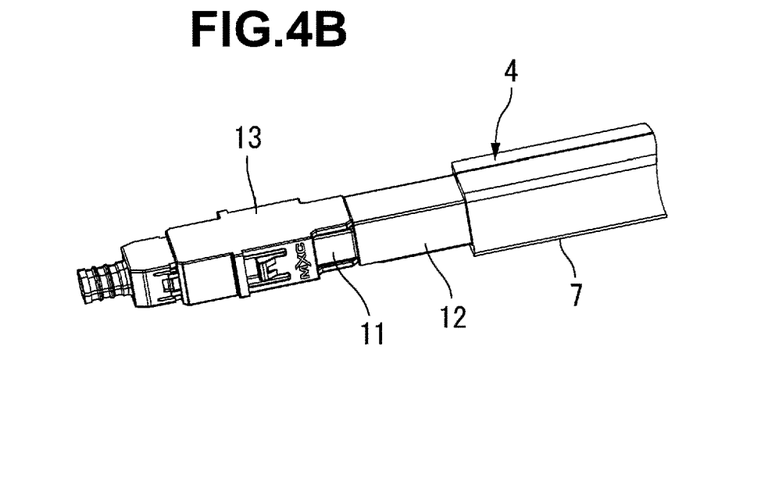
FIG. 4B is a perspective view showing a state in which the receptacle is fitted in the cleaning head so as to explain a procedure of cleaning the ferrule with lenses in the receptacle.

To clean the ferrule 14 with lenses in the receptacle 13, first, the recessed portion 13a of the receptacle 13 is made to oppose the cleaning head 4, as shown in FIG. 4A. Next, as shown in FIG. 4B, the first rectangular tube 11 of the cleaning head 4 is fitted in the recessed portion 13a. Since the aspect ratios of the recessed portion 13a and the opening portion of the first rectangular tube 11 are not 1:1, the receptacle 13 is not attached to the first rectangular tube 11 in a wrong orientation. That is, the widthwise direction of the cleaning cloth 3 is parallel to the widthwise direction (X direction) of the plurality of lenses 15.

After the receptacle 13 is fitted on the first rectangular tube 11, the receptacle 13 is moved rearward until its distal end face abuts against the front end face of the second rectangular tube 12.

Figure 16:
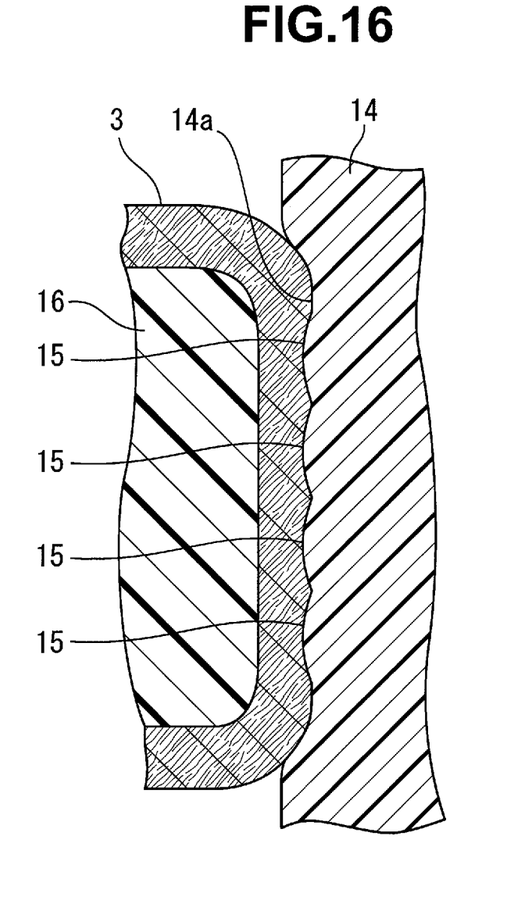
FIG. 16 is an enlarged sectional view showing the contact portion between the cleaning cloth and lenses.

When the distal end face of the receptacle 13 abuts against the front end face of the second rectangular tube 12, the cleaning cloth 3 is brought into contact with the number of lenses 15 of the ferrule 14 with lenses and pressed against the number of lenses 15 by the spring force of the first compression coil spring 18, as shown in FIG. 16. At this time, the tensile force acting on the cleaning cloth 3 is received by the first chemical fibers 31 but is hardly transmitted to the second chemical fibers 32. For this reason, the slack portions 32a of the second chemical fibers 32 are not stretched by the tensile force, and are maintained in the initial state, that is, in the state in which the cleaning cloth 3 softly swells.

When the cleaning cloth 3 is pressed against the lenses 15 of the lens-type connector, the slackened second chemical fibers 32 of the cleaning cloth 3 enter the concave portions between the plurality of lenses 15 (convex portions), and the cleaning cloth 3 comes into contact with the whole region of all lenses 15 while conforming to the unevenness made by the plurality of lenses 15.

Figure 4C:
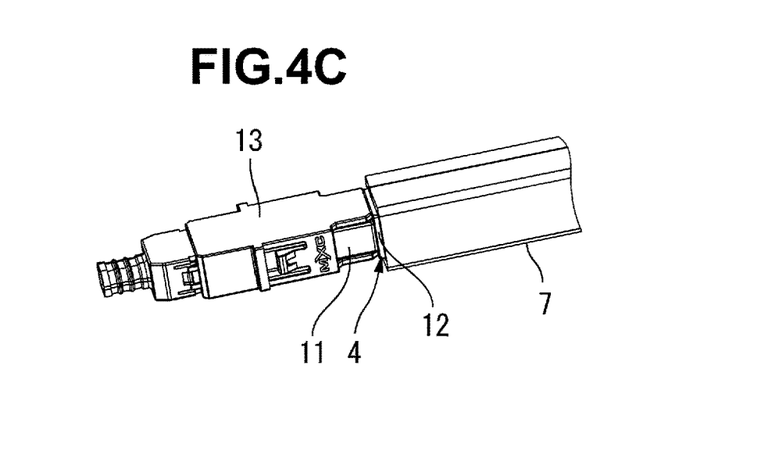
FIG. 4C is a perspective view showing a state in which the cleaning head is pushed into the case so as to explain a procedure of cleaning the ferrule with lenses in the receptacle.

After that, the optical connector cleaning tool 1 is pushed toward the receptacle 13, and the cleaning head 4 is pushed into the case 2 against the spring force of the second compression coil spring 19, as shown in FIG. 4C. When the cleaning head 4 thus moves with respect to the case 2, the cleaning cloth 3 is wound up by the wind-up reel 21 and moved with respect to the lenses 15 so as to wipe and clean the whole surface region of all lenses 15.

Hence, even if the cleaning target portion includes the plurality of lenses 15 of the ferrule 14 with lenses provided in the receptacle 13, the optical connector cleaning tool 1 can wipe and clean the whole region of the lenses 15 by the cleaning cloth 3.

Figure 5A:
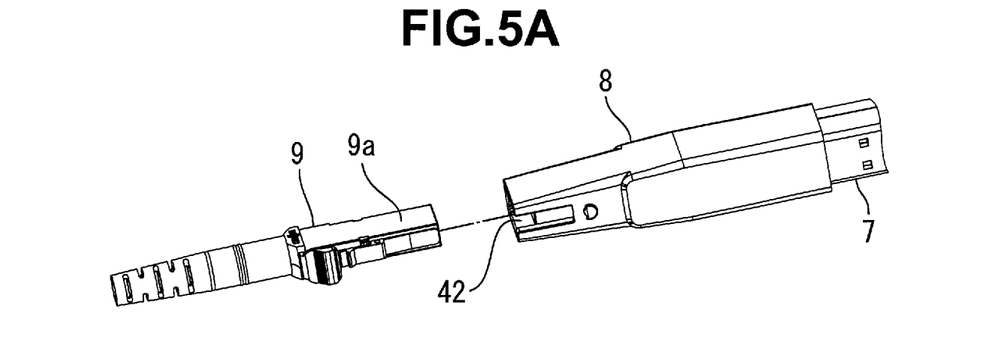
FIG. 5A is a perspective view showing a state in which an optical plug faces the cap so as to explain a procedure of cleaning an optical connector in the optical plug.
Figure 17:
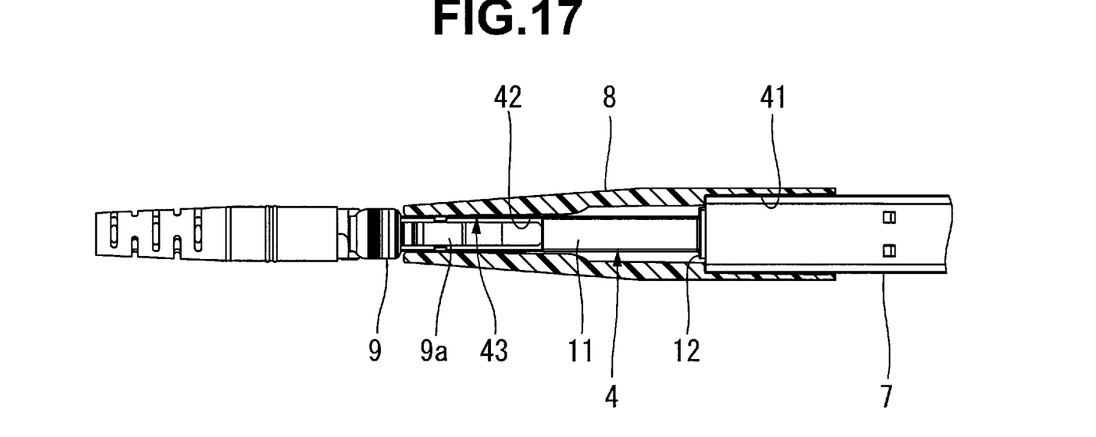
FIG. 17 is a sectional view of the cap in which the cleaning head and the optical plug are fitted.

To clean the ferrule 14 with lenses in the optical plug 9, the cap 8 is attached to the nose portion 7, as shown in FIG. 5A. Note that the cover 8a of the cap 8 is not illustrated in FIGS. 5A to 5E. The cap 8 is formed into a rectangular tubular shape. A first hole 41 in which the nose portion 7 is detachably fitted is formed at one end, that is, the rear end of the cap 8, as shown in FIG. 17. A second hole 42 in which the connecting portion 9a of the optical plug 9 is detachably fitted is formed at the other end, that is, the front end of the cap 8.

Figure 5B:
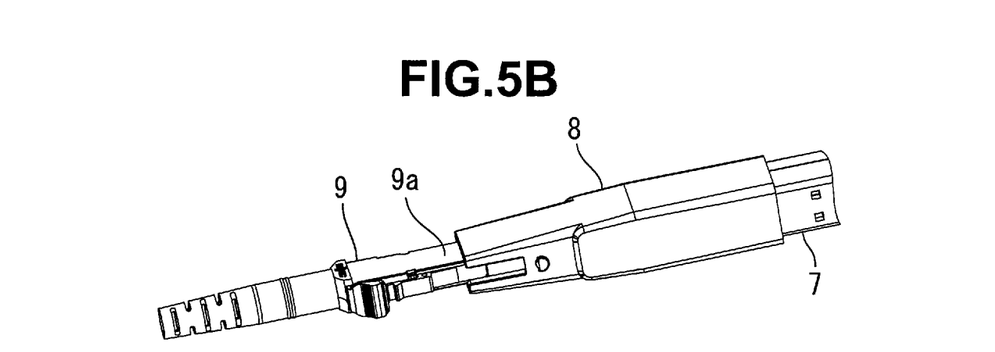
FIG. 5B is a perspective view showing a state in which the optical plug is fitted in the cap so as to explain a procedure of cleaning the optical connector in the optical plug.

After the cap 8 is attached to the nose portion 7 in a state in which the nose portion 7 is fitted in the first hole 41 of the cap 8, the optical plug 9 is fitted in the second hole 42 of the cap 8, as shown in FIG. 5B. The aspect ratios of the opening of the first hole 41 and the opening of the second hole 42 are not 1:1. For this reason, when attaching the cap 8 to the nose portion 7 and when attaching the optical plug 9 to the cap 8, they are not attached in a wrong orientation. That is, the widthwise direction of the cleaning cloth 3 is parallel to the widthwise direction (X direction) of the plurality of lenses 15. At this time, the optical plug 9 is moved until the first rectangular tube 11 abuts against the ferrule 14 with lenses in the optical plug 9, as shown in FIG. 5C.

Figure 5C:
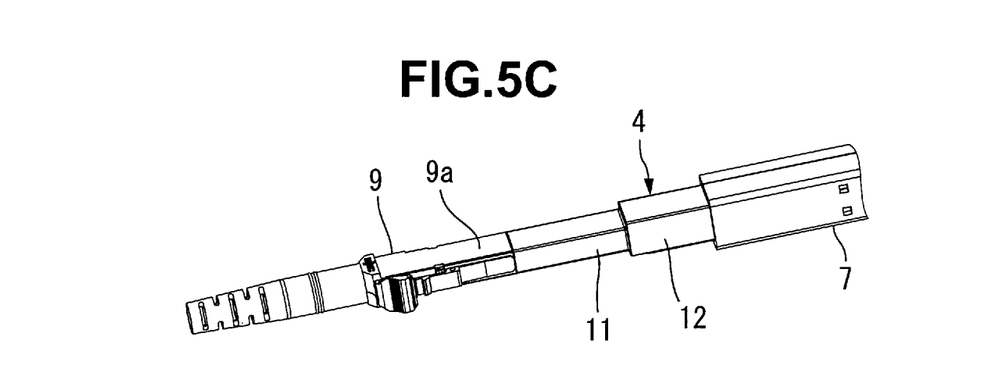
FIG. 5C is a perspective view showing a state in which the optical plug is in contact with the cleaning head so as to explain a procedure of cleaning the optical connector in the optical plug, in which the cap is not illustrated.

The cap 8 is not illustrated in FIG. 5C. When the ferrule 14 with lenses abuts against the first rectangular tube 11, the cleaning cloth 3 is pressed against the plurality of lenses 15 by the spring force of the first compression coil spring 18.

Figure 5D:
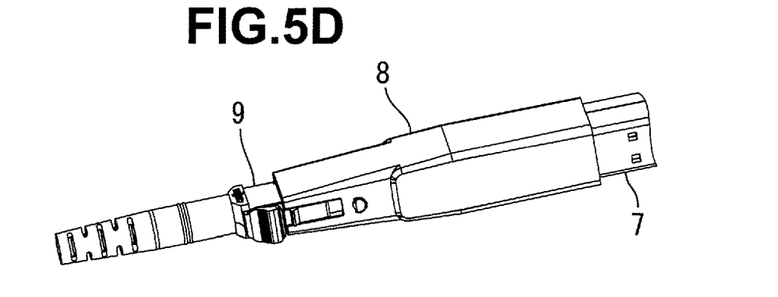
FIG. 5D is a perspective view showing a state in which the cleaning head is pushed into the case so as to explain a procedure of cleaning the optical connector in the optical plug.
Figure 5E:
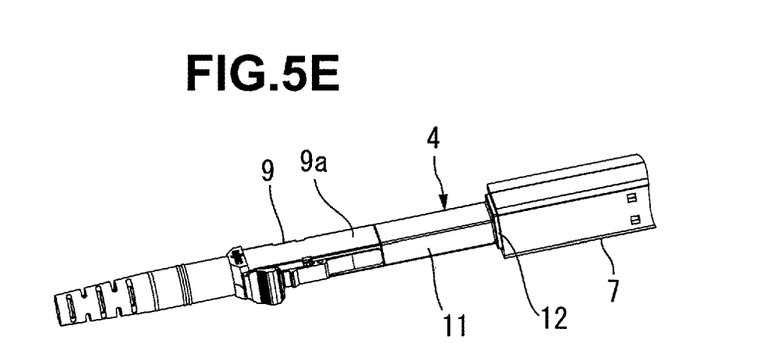
FIG. 5E is a perspective view showing a state in which the cleaning head is pushed into the case so as to explain a procedure of cleaning the optical connector in the optical plug, in which the cap is not illustrated.

In this state, the optical connector cleaning tool 1 is pushed toward the optical plug 9, and the cleaning head 4 is pushed into the case 2 against the spring force of the second compression coil spring 19, as shown in FIGS. 5D and 5E. The cap 8 is not illustrated in FIG. 5E. At this time, the optical plug 9 moves in a state in which it is fitted in the second hole 42 of the cap 8. That is, the second hole 42 forms a guide 43 (see FIG. 17) of the optical plug 9 (ferrule 14 with lenses) that moves with respect to the case 2 together with the cleaning head 4.

When the cleaning head 4 thus moves with respect to the case 2, the cleaning cloth 3 is wound up by the wind-up reel 21 and moved with respect to the lenses 15 so as to wipe and clean the whole surface region of all lenses 15.

Hence, according to this embodiment, when the cleaning cloth 3 is pressed against the cleaning target portion of a connector, the slack portions 32a of the warps 26 of the cleaning cloth 3 are inserted into the concave portions between the convex portions of the cleaning target portion. It is therefore possible to clean the whole region of the uneven portions of the cleaning target portion by the slack portions 32a and other portions of the cleaning cloth 3. In addition, since the cleaning cloth 3 has the slack portions 32a on the warps 26, the surface of the cleaning cloth 3 softly swells. Hence, the cleaning cloth 3 never damages the cleaning target portion. Even if the cleaning target portion includes the plurality of lenses 15 of the ferrule 14 with lenses, the optical connector cleaning tool 1 can wipe and clean the whole region of the lenses 15 by the cleaning cloth 3 without damaging the lenses 15.

Additionally, when cleaning the ferrule 14 with lenses in the receptacle 13, since the portion of the rectangular tube 11 is completely included in the receptacle 13, the fitting length between the two members, that is, the rectangular tube 11 and the receptacle 13 is long, and the clearance between the two members is small, the cleaning unit is pressed against the ferrule 14 with lenses at a high perpendicularity, and the cleaning is more reliably performed. More specifically, the fitting length between the rectangular tube 11 and the receptacle is about 20 mm, and the clearance between the two members is 1 mm or less.

Furthermore, when cleaning the ferrule 14 with lenses in the optical plug 9, the connecting portion 9a of the optical plug 9 is completely included in the second hole 42 of the cap 8. Since the fitting length between the two members, that is, the connecting portion 9a of the optical plug 9 and the second hole 42 of the cap 8 is long, and the clearance between the two members is small, the cleaning unit is pressed against the ferrule 14 with lenses at a high perpendicularity, and the cleaning is more reliably performed. More specifically, the fitting length between the connecting portion 9a of the optical plug 9 and the second hole 42 of the cap 8 is about 20 mm, and the clearance between the two members is 1 mm or less.

Note that when the swell was adjusted by slackening by the chemical treatment, a satisfactory cleaning result was obtained when the thickness of the cleaning cloth 3 fell within the range of 0.4 mm to 0.6 mm. In particular, when the thickness was about 0.5 mm, the best cleaning result was obtained.

The fabric 25 that forms the cleaning cloth 3 according to this embodiment includes the plurality of warps 26 formed from the plurality of first thread materials 28 each including the first chemical fiber 31 and the second chemical fiber 32, and the weft 27 formed from the second thread material 33 interwoven with the plurality of warps 26.

For this reason, according to this embodiment, it is possible to ensure the cloth strength by the weft 27 and suppress excessive stretch of the cleaning cloth 3 at the time of cleaning. Hence, since the thickness of the cleaning cloth 3 can be ensured at the time of cleaning, an optical connector cleaning tool capable or more reliably performing cleaning can be provided.

In the cleaning cloth 3 according to this embodiment, the two ends in the widthwise direction are formed by the folded portions 27a of the weft 27. For this reason, no foreign substances are generated, as compared to a cleaning cloth whose two ends are formed by a method such as heat cut or ultrasonic cut. It is therefore possible to provide an optical connector cleaning tool capable of properly cleaning the cleaning target portion without leaving foreign substances on the cleaning target portion after cleaning.

The second thread material 33 according to this embodiment is formed by a chemical fiber whose shrinkage factor in the chemical treatment is small.

For this reason, the cleaning cloth 3 according to this embodiment has a width as designed because the width (weft direction) of the cleaning cloth 3 changes little after the chemical treatment. Hence, even when cleaning the cleaning target portion formed by the plurality of lenses 15 arranged in the direction parallel to the widthwise direction of the cleaning cloth 3, all lenses 15 can reliably be cleaned.

The fabric 25 that forms the cleaning cloth 3 according to this embodiment is a twill. Hence, since no regulation by the weft 27 exists, and there are many wide portions where the second chemical fibers 32 can slacken, the slack portions 32a sufficiently project. As a result, it is possible to provide an optical connector cleaning tool that hardly generates an unwiped portion even if the cleaning target portion is uneven.

The cleaning tool that cleans the lenses of a ferrule with lenses is required to have a structure capable of connecting both the receptacle of an optical port and the plug of an optical cable. If a cleaning tool of this type cleans the lenses of a ferrule with lenses for multiple channels, which is called an MXC, a function of holding the connector is also necessary such that the cleaning cloth properly comes into contact with the lenses in a state in which the gap between the lens portion and the housing portion is small.

The cap 8 configured to hold the optical plug 9 is detachably attached to the optical connector cleaning tool 1 according to this embodiment. The second hole 42 of the cap 8 forms the guide 43 of the optical plug 9 (ferrule 14 with lenses) that moves with respect to the case 2 together with the cleaning head 4.

For this reason, when the optical plug 9 is inserted into the second hole 42 of the cap 8 attached to the case 2, the ferrule 14 with lenses can be positioned with respect to the cleaning head 4. The cleaning is executed as the optical plug 9 moves with respect to the cap 8 along the guide 43 formed from the second hole 42, and the ferrule 14 with lenses in the positioned state moves deep into the second hole 42.

Hence, according to this embodiment, since the ferrule 14 with lenses can accurately be held, an optical connector cleaning tool with high cleaning performance can be provided.

In addition, the cleaning head 4 can be formed into such a shape that allows the receptacle 13 (female-type optical connector) to be fitted on it. For this reason, the optical connector cleaning tool 1 can clean the optical plug 9 (male-type optical connector) and the receptacle 13 (female-type optical connector).

Figure 18:
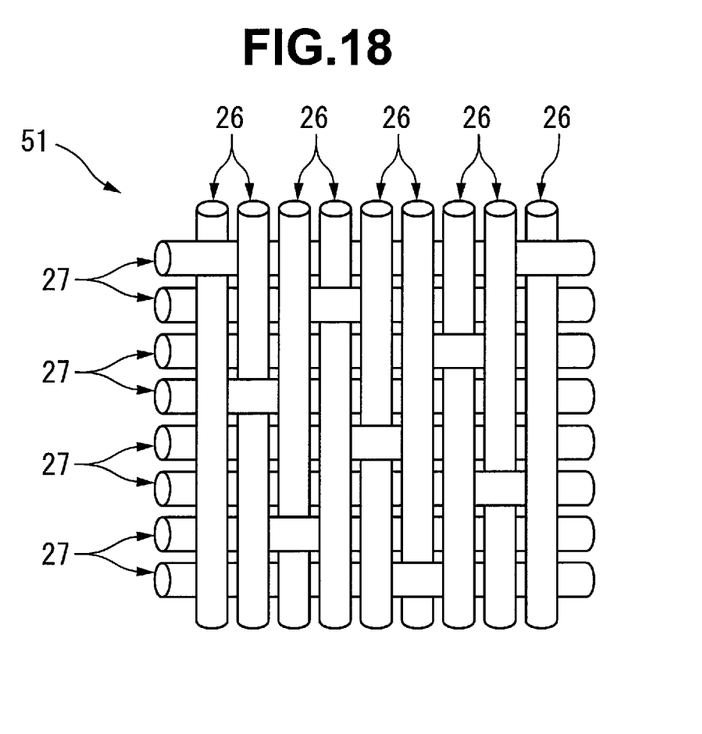
FIG. 18 is a schematic view showing the structure of a fabric serving as a cleaning cloth.
Figure 19:
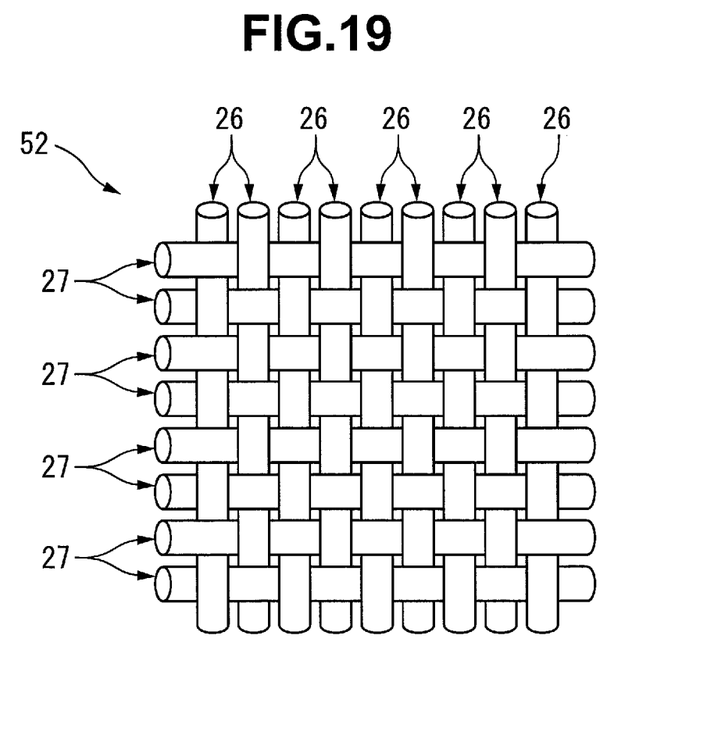
FIG. 19 is a schematic view showing the structure of a fabric serving as a cleaning cloth.

The cleaning cloth 3 according to the above-described embodiment is formed by the twill weave fabric 25. However, the present invention is not limited to this. The cleaning cloth 3 can also be formed using, for example, a satin weave fabric 51 as shown in FIG. 18 or a plain weave fabric 52 as shown in FIG. 19. Members that are the same as or similar to those described with reference to FIGS. 1 to 17 are denoted by the same reference numerals in FIGS. 18 and 19, and a detailed description thereof will appropriately be omitted.

The satin weave is one of satin weaves, in which the number of texture points where the warps 26 and the wefts 27 intersect is decreased as much as possible, the texture points are dispersed so as not to continue, and only the warps 26 or wefts 27 are arranged to tightly float on the cloth surface. The satin weave cleaning cloth 3 can readily implement a softly swelling shape to an extent equal to or less than the twill because the number of cross points is smaller than in the twill. That is, since the slack portions 32a of the warps 26 are formed as in the twill, the optical connector cleaning tool 1 using the satin weave cleaning cloth 3 hardly generates an unwiped portion even if the cleaning target portion is uneven.

The plain weave is woven in a state in which the warps 26 and the wefts 27 alternately cross. In the plain weave cleaning cloth 3, since the number of cross points between threads is largest in the above-described three types of weaves, the slack portions 32a are formed relatively small by shrinking the first chemical fibers 31 by the chemical treatment. For this reason, the optical connector cleaning tool 1 including the plain weave cleaning cloth 3 can be used to clean a cleaning target portion whose unevenness is not so large.

In the above-described embodiment, an example in which the composition ratio of the first chemical fibers 31 to the second chemical fibers 32 is set to 6:4 has been described. However, in the present invention, the composition ratio of the first chemical fibers 31 to the second chemical fibers 32 can appropriately be changed. For example, the volume ratio of the first chemical fibers 31 may be set to 40%, and the volume ratio of the second chemical fibers 32 may be set to 60%.

In the above-described embodiment, an example in which the second chemical fibers 32 are slackened by a chemical treatment has been described. However, the method of setting the second chemical fibers 32 in the slack state is not limited to the chemical treatment, and can appropriately be changed. According to the above-described embodiment, since the second chemical fibers 32 are slackened by a chemical treatment using a drug solution, the slack portions 32a can be formed almost uniformly in the whole region of the cleaning cloth 3, and an optical connector cleaning tool with higher cleaning performance can be provided.

EXPLANATION OF THE REFERENCE NUMERALS AND SIGNS

1 . . . optical connector cleaning tool, 3 . . . cleaning cloth, 4 . . . cleaning head, 15 . . . lens (cleaning target portion), 25, 51, 52 . . . fabric, 26 . . . warp, 28 . . . first thread material, 31 . . . first chemical fiber, 32 . . . second chemical fiber, 32a . . . slack portion

The invention claimed is:

1. An optical connector cleaning tool comprising:
a cleaning head that faces a cleaning target portion of an optical connector; and
a cleaning cloth that moves with respect to the cleaning head in a state in which the cleaning cloth is in contact with the cleaning target portion,
wherein the cleaning cloth is formed into a strip shape by a fabric including a plurality of warps in which a longitudinal direction thereof is a moving direction of the cleaning cloth moving with respect to the cleaning head, and a weft that regulates the plurality of warps,
each of the plurality of warps includes a first chemical fiber and a second chemical fiber,
the first chemical fiber is in a stretched state, and the second chemical fiber is in a slack state,
the second chemical fiber includes slack portions that project from the first chemical fiber at portions where not regulated by the weft, and
the first chemical fiber resists a tension force acting on the cleaning cloth by the cleaning cloth being wound-up at the time of cleaning, and the slack portions of the second chemical fiber are not stretched by the tension force.

2. The optical connector cleaning tool according to claim 1, wherein the fabric includes:
the plurality of warps formed by a plurality of first thread materials that include the first chemical fiber and the second chemical fiber, and
the weft formed by a second thread material interwoven with the plurality of warps.

3. The optical connector cleaning tool according to claim 1 or 2, wherein the fabric is a twill weave fabric.

4. The optical connector cleaning tool according to claim 1 or 2, wherein the fabric is a satin weave fabric.

5. The optical connector cleaning tool according to claim 2, wherein the first chemical fiber has a larger shrinkage factor in a chemical treatment than a shrinkage factor of the second chemical fiber.

6. The optical connector cleaning tool according to claim 5, wherein the second thread material is formed by the second chemical fiber.

7. The optical connector cleaning tool according to claim 1 or 2, further comprising:
a case that movably supports the cleaning head in a direction coming closer or separating away from the cleaning target portion;
a driving mechanism that is provided in the case, and pulls and moves the cleaning cloth with respect to the cleaning head as the cleaning head moves to an opposite side of the cleaning target portion with respect to the case; and
a tubular cap including a first hole formed at one end, in which the case is detachably fitted, and a second hole formed at the other end, in which a connecting portion of an optical connector is fitted,
wherein the second hole forms a guide to the connecting portion of the optical connector that moves with respect to the case together with the cleaning head.

8. The optical connector cleaning tool according to claim 1, wherein the first chemical fiber has a larger shrinkage factor in a chemical treatment than a shrinkage factor of the second chemical fiber.

\* \* \* \* \*